INVENTOR
Walter A. Bridgeman
BY Joseph F. P. Newhall
ATTORNEY

Dec. 12, 1950   J. F. P. NEWHALL ET AL   2,534,205
APPARATUS FOR REMOVING WATER BY CAPILLARY
ACTION FROM MOIST PERISHABLES
Filed July 3, 1947   2 Sheets-Sheet 2

INVENTOR
Walter A. Bridgeman
Joseph F. P. Newhall
BY
Robert J. Leahy
ATTORNEY

Patented Dec. 12, 1950

2,534,205

UNITED STATES PATENT OFFICE 2,534,205

APPARATUS FOR REMOVING WATER BY CAPILLARY ACTION FROM MOIST PERISHABLES

Joseph F. P. Newhall, St. Petersburg, Fla., and Walter A. Bridgeman, Racine, Wis., assignors to S. C. Johnson & Son, Inc., Racine, Wis.

Application July 3, 1947, Serial No. 758,950

2 Claims. (Cl. 34—95)

This invention relates to an apparatus of removing external water by capillary action from moist perishables and apparatus therefor. More particularly, it relates to a novel apparatus of removing the external water from perishables such as fruit and vegetables and apparatus therefor.

It is customary in the packing of perishables such as fruits and vegetables to wash or spray them. After washing, the external water must be removed from the perishables and the perishables dried as rapidly as possible.

Many types of apparatus have been proposed to accomplish this, but these devices are subject to various defects. For example, while brass-roll eliminators are commonly used, they do not dry the perishables sufficiently or rapidly enough if the perishables are to be subsequently waxed prior to packing.

In United States Patent No. 1,943,874 the patentee proposed the use of a plurality of rollers provided with an absorbent fabric surface of felt or toweling. The absorbent material was freed of water by contacting with a plurality of spaced slats.

United States Patent No. 2,317,144 recognized that the absorbent fabric surface of the roller would become matted, so proposed the use of a soft rubber base under the absorbent fabric surface with a little different wringer mechanism. This patent, while eliminating matting, is subject to the same limitations as United States Patent No. 1,943,874 in that the absorbent fabric is easily saturated and will not efficiently remove the external water from the perishable.

Now, in accordance with our invention, we have discovered a novel apparatus for efficiently and rapidly drying perishables such as fruit and vegetables which comprises removing the external water by capillary action by passing moist perishables through a drying zone composed of revolving cellular material, and continuously removing the water from the cellular material.

The cellular material is preferably intercellular rubber, but may, in addition, be of animal or wool sponge, or synthetic material having an intercellular or sponge-like structure.

The roller of the water eliminator comprises preferably a hard, cylindrical core and a layer of cellular material forming the periphery of the roller.

The invention will be understood by reference to the following description taken in connection with the accompanying drawing in which is shown a water eliminator apparatus particularly adapted for carrying out the method of this invention. While we have developed the water eliminator and eliminator rollers illustrated herewith for carrying out our novel method, it is to be understood that the method is not limited to this type of eliminator alone. For example, the method may be carried out in apparatus having a single roller rather than a plurality of rollers and other wringer devices.

The same reference numerals have been used for the designation of like parts throughout and in the drawing.

Figure 1:
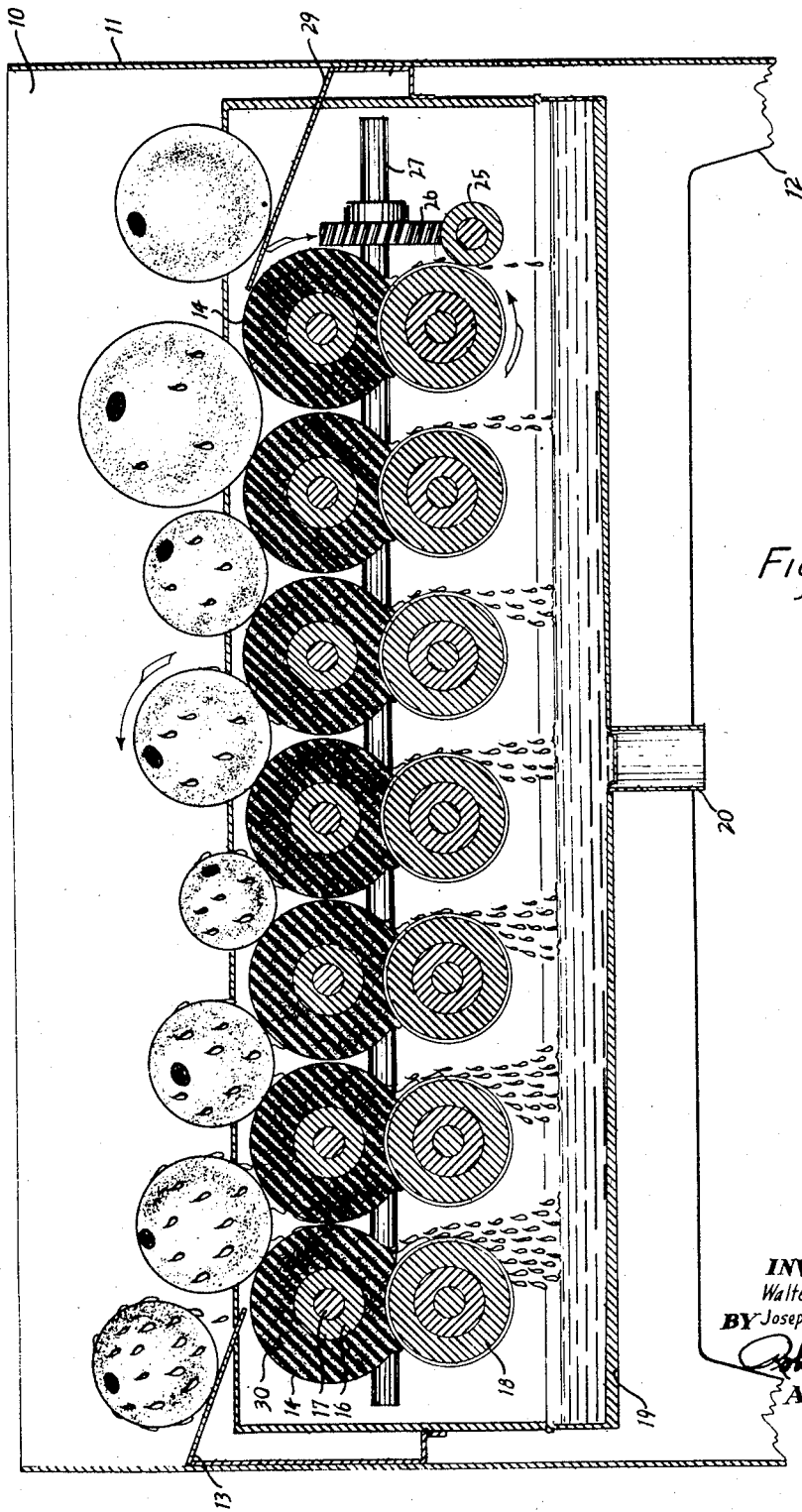
Figure 1 is a side elevational view in section showing the operation of the rolls.
Figure 2:
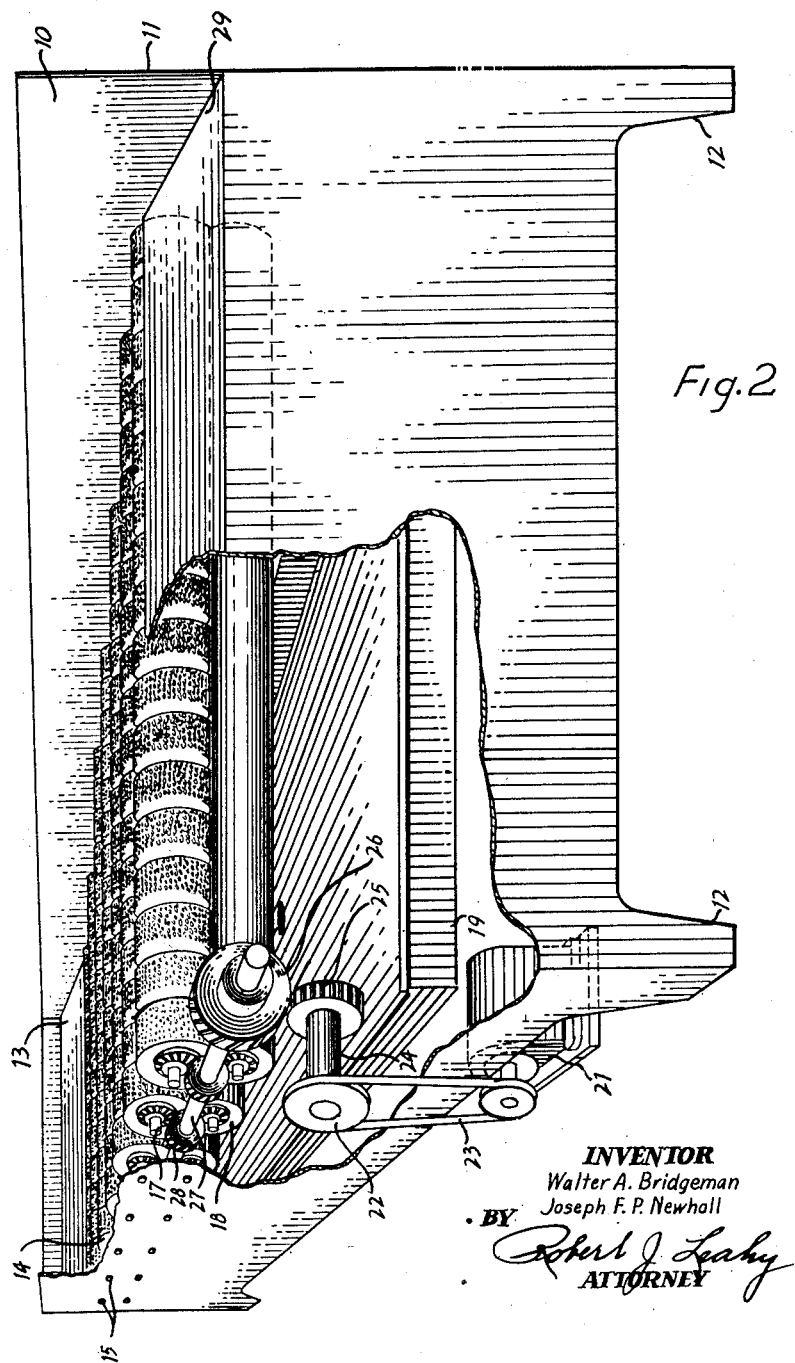
Figure 2 is a perspective view of the water eliminator with part broken away.

Referring more specifically to the drawing, the water eliminator 10 includes a frame 11, having legs 12 and is provided with a feed chute 13 and a discharge chute 29. A plurality of transverse intercellular rubber rollers 14 are rotatably mounted by suitable means to the frame 11 at 15. The rollers 14 consist of a hard, cylindrical core 16, preferably of metal or wood, mounted upon an axle 17. Around the core 16, forming the outside periphery or surface of the roller 14 is securely affixed, as by cementing, a layer of intercellular rubber 30. The intercellular layer may be a solid piece, or may be a series of donut-shaped pieces of intercellular rubber.

Below the rollers 14 are positioned a plurality of cylindrical metal squeeze rollers 18, either perforated or solid. These squeeze rollers 18 are so positioned that they force the saturated intercellular rubber rollers 14 upward causing water to be expelled and by gravity fall into a catch pan 19 provided with a drain pipe 20.

The rollers 14 and 18 are rotated by means of a motor 21 which is connected to a pulley 22 by means of a belt 23. The pulley 22 is affixed to a shaft 24 which by means of interlocking gears 25 and 26 drives a drive shaft 27 which in turn rotates the rollers 14 and 18 by means of gear assembly 28.

For purposes of illustrating the operation of the apparatus, water-saturated oranges shown in Figure 1 enter the water eliminator 10 by means of the feed chute 13 and proceed by gravity upon the transverse intercellular rubber rollers 14. The water in the form of drops and film that adheres to the oranges is by capillary action transmitted from the oranges into the body of the intercellular rubber which is rotating upon its axis. The continuous rotation of the rollers 14 brings the saturated area to bear upon the rotating squeeze rolls 18 and forces the intercellular rubber upward causing the water to be expelled and by gravity fall into the catch pan 19. The water may then be removed from the catch pan 19 by opening the drain pipe 20. Continuation of this cycle causes the oranges to proceed over the series of intercellular rubber rollers 14, excess water being removed enroute, the oranges leaving the drying zone by means of the discharge chute 29.

While the operation of this apparatus has been illustrated with the use of oranges, it will be understood that our invention is not so limited. The water eliminator described herein is suitable for removing external water from perishables such as fruit and vegetables. Fruits which may be dried include oranges, lemons, grapefruit, tangerines, apples and the like. Vegetables which may be dried include tomatoes, potatoes, sweet potatoes, cucumbers, peppers and the like.

Other modes of applying the principle of the invention may be employed instead of those explained change being made as regards the apparatus herein disclosed, provided the steps or elements stated by any of the following claims, or the equivalent of such stated steps or elements be employed.

The term intercellular rubber within the meaning of this specification is intended to mean cellular rubber having intercommunicating cells.

We claim:

1. In a water eliminator in which perishables such as fruit and vegetables travel in rolling contact with horizontal rollers having fixed axis placed transversely to the direction of travel of the perishables and having absorbent surfaces from which water is wrung out by wringer rollers placed thereagainst, the improved roller comprising a hard core positioned within the hollow centers of a series of doughnut-shaped pieces of cellular rubber having intercommunicating cells, said pieces having continuous circumferential surfaces forming the contacting periphery of said roller, the surfaces of said pieces being substantially equidistant at all points from said core.

2. In a water eliminator in which perishables such as fruit and vegetables travel in rolling contact with horizontal rollers having fixed axis placed transversely to the direction of travel of the perishables and having absorbent surfaces from which water is wrung out by wringer rollers placed thereagainst, the improved roller comprising a hard core positioned within the hollow centers of a plurality of doughnut-shaped pieces of cellular rubber having intercommunicating cells, said pieces having continuous circumferential surfaces forming the contacting periphery of said roller, said contacting periphery being substantially equidistant at all points from said core.

JOSEPH F. P. NEWHALL.
WALTER A. BRIDGEMAN.

REFERENCES CITED

The following references are of record in the file of this patent:

UNITED STATES PATENTS

| Number | Name | Date |
|---|---|---|
| 1,250,959 | Brown | Dec. 25, 1917 |
| 1,927,955 | Schuster | Sept. 26, 1933 |
| 1,154,585 | Samandji | Apr. 18, 1939 |
| 2,195,371 | Moore | Mar. 26, 1940 |
| 2,272,677 | Memeray et al. | Feb. 10, 1942 |
| 2,287,768 | Eckstein | June 30, 1942 |
| 2,317,144 | Grant | Apr. 20, 1943 |